United States Patent [19]

Kramer

[11] 4,130,466

[45] Dec. 19, 1978

[54] ANTIFOULING COATING FOR ALUMINUM STRUCTURES

[75] Inventor: Irvin R. Kramer, Baltimore, Md.

[73] Assignee: The United States of America as represented by the Secretary of the Navy, Washington, D.C.

[21] Appl. No.: 911,267

[22] Filed: May 31, 1978

[51] Int. Cl.² .................. C25D 5/48; B32B 15/08
[52] U.S. Cl. .................. 204/38 A; 204/35 N; 427/419 G; 428/470
[58] Field of Search .................. 204/35 N, 38 A; 427/419 G; 148/6.1; 428/470

[56] References Cited

U.S. PATENT DOCUMENTS

| | | | |
|---|---|---|---|
| 2,785,098 | 3/1957 | Cunningham | 204/38 |
| 3,305,388 | 2/1967 | Waack | 428/470 |
| 3,307,973 | 3/1967 | Gibbons, Jr. | 428/470 |
| 3,440,150 | 4/1969 | Kramer | 204/35 N |
| 3,510,411 | 5/1970 | Kramer | 204/38 A |
| 3,672,966 | 6/1972 | Geisler | 204/35 N |
| 3,765,933 | 10/1973 | Lehureau | 428/470 |
| 4,039,494 | 8/1977 | Drisko | 260/22 A |

*Primary Examiner*—John H. Mack
*Assistant Examiner*—William T. Leader
*Attorney, Agent, or Firm*—R. S. Sciascia; Q. E. Hodges

[57] ABSTRACT

Aluminum objects which are designed to be submersed, submerged, or buried are rendered antifouling by anodizing the surface of the aluminum and impregnating therein, for example, an organometallic compound containing tin. Long term antifouling is achieved due to the low rate of leaching of the organotin compound, while adverse environmental effects are minimized.

9 Claims, No Drawings

ANTIFOULING COATING FOR ALUMINUM STRUCTURES

The invention described herein may be manufactured and used by or for the Government of the United States of America for governmental purposes without the payment of any royalties thereon or therefor.

BACKGROUND OF THE INVENTION

This invention relates to antifouling coatings, and more particularly to a method for inhibiting the fouling of aluminum and aluminum-base alloy structures.

The protection generally used to prevent ship fouling by barnacles and other marine organisms is to cover those portions exposed to attack with paints containing antifouling compounds. Recent developments have shown that fouling is effectively prevented by the use of organometallic compounds containing tin, often incorporated into a paint. While paints are effective they do suffer from several drawbacks. For example, the rate of leaching of the antifouling compounds from the paints increases with the speed of the craft. This is undesirable, because the effective life of the coating is shortened and the coating must be reapplied. Further, since the antifouling compounds are diluted by their mixture with paint, the concentration of the compound per unit of exposed area is decreased, thereby decreasing the effectiveness for a given amount of compound. To be effective, the concentration of the antifouling ingredient in the paint should be greater than about 30% to 40% by weight. This high concentration combined with the high rate of leaching could have a detrimental effect on the environment. In addition, the shear forces generated by a ship moving through water cause peeling of the paints, leaving unprotected areas exposed to fouling.

In buried pipeline applications, prior art practices have included the use of copper-nickel pipes which are inherently antifouling. Aluminum pipes have the advantage of being light-weight, but they are prone to fouling.

Thus, there is a need for an antifouling coating to decrease the drag produced by the attachment of barnacles and other organisms to marine craft, and to prevent the fouling of buried aluminum pipelines, without the disadvantages of dilution, peeling, high rate of leaching, and adverse environmental effects.

SUMMARY OF THE INVENTION

Accordingly, the present invention overcomes many of the disadvantages of prior art coating techniques by providing a method for applying an antifouling coating to aluminum or aluminum-base alloy structures.

Briefly, an antifouling compound, such as an organometallic compound containing tin, is incorporated into the pores in the anodized surface of aluminum objects which may be exposed to fouling. The anodizing process may advantageously be carried out in an aqueous solution containing greater than about 15% by weight of sulfuric acid. After washing to remove the excess acid, the object is dipped into a molten bath containing, for example, a long-chain fatty acid and greater than about 20% by weight of the antifouling compound. In some cases, depending upon the particular aluminum alloy, the pores in the anodized layer may be too large to properly retain the impregnant. In such cases, the impregnation step is preceeded by immersion of the object in, for example, boiling water for a time to only partially seal or close the oxide layer pores.

OBJECTS OF THE INVENTION

It is therefore an object of the present invention to provide a method for applying an antifouling coating to aluminum or aluminum alloy objects in a manner such that the coating retains its effectiveness for a long period of time.

Another object of the present invention is to provide a coating method that renders the coating impervious to peeling.

A further object of the present invention is to provide a coating method that results in a low rate of leaching.

A still further object of the present invention is to provide a coating method whereby the coating is impregnated into pores in the oxide layer of anodized aluminum objects.

Other objects and many of the attendant advantages of the present invention will be readily apparent as the invention becomes better understood by reference to the following detailed description when considered in conjunction with the appended claims.

DESCRIPTION OF THE PREFERRED EMBODIMENT

In applying the process of the present invention to an aluminum alloy object, the following sequence of steps can advantageously be employed. The object to be treated is first cleaned and degreased, then anodized, for example, in a sulfuric acid bath to provide an oxide layer on the surface thereof greater than about 7.5 microns in thickness. Next, the object is withdrawn from the anodizing bath, rinsed in water to remove any excess acid, and then dried. This is followed by immersion of the anodized object into a molten bath containing the antifouling compound at a concentration greater than about 20% by weight. Other methods may also be effectively used to impregnate the pores of the anodized layer. For example, the impregnant may be applied by brushing, rolling, or spraying. Finally, the object is cleaned to remove any excess impregnant.

The anodizing step is advantageously carried out in an aqueous solution containing about 15% to about 50% by weight of sulfuric acid at a temperature of about 20° C. to about 40° C. These temperature and acid concentration ranges are applicable to any aluminum or aluminum alloy, although a particular alloy may react best to a specific combination of parameters within these ranges. It has been found that, when using the sulfuric acid method, the object must be anodized for at least about 10 minutes to obtain an oxide layer greater than about 7.5 microns in thickness on the surface of the aluminum, and the subsequent impregnation step is particularly effective when the thickness of the anodic oxide layer is between about 7.5 microns and about 25 microns.

The anodizing process produces an oxide layer having pores therein on the order of about several hundred Angstroms in diameter. In some cases, depending upon the particular aluminum alloy, the pore size may be too large to properly retain an impregnant. For these alloys it is necessary to partially seal the pores in the anodized layer by means of water, thereby reducing the pore diameter to a size that will effectively contain and retain the impregnant. Sealing by means of water includes such methods as sealing at the boiling point of pure or sightly acidic (pH 6) water and sealing in steam at temperatures above the boiling point of water. The partial sealing step should be applied for between about 10 minutes to about 30 minutes in order to effectively reduce the diameter of the oxide layer pores. An example of aluminum alloys which require partial sealing prior to impregnation are the 5000 and 6000 series alloys, as designated by the American Standards Association (ASA). ASA 2000 and ASA 7000 series alloys, on the other hand, may be effectively impregnated without partial sealing.

Following the partial sealing process, or following the anodizing step for alloys which do not require partial sealing, the object is dried and then immersed in a molten bath containing the antifouling compound. The temperature should be chosen so that the impregnant is very fluid but not so high as to cause decomposition of the constituents in the bath. To enable adequate impregnation of the antifouling compound into the oxide layer pores, the object should remain in the molten bath for at least about one minute. Effective antifouling compounds that may be used in accordance with the present invention include: tributyltin, tripropyltin esters of vinyl, vinyl maleic acid copolymer resins, polymers of tributyltin, tripropyltin esters of acrylic acids, tripropyltin esters of methacrylic acids, and copolymers with other acrylic and vinyl copolymers. Alternatively, monomers of the above mentioned resins can be impregnated into the anodized pores and polymerized in situ. The impregnation can advantageously be carried out by incorporating one of the aforementioned antifouling compounds at a concentration of at least about 20% by weight into a molten bath of long-chain fatty acids, alcohols, or amines. Although the alcohols and amines are effective, the fatty acids are preferred because of their low cost. The long-chain compounds that are effective are those with at least about 10 carbon atoms up to about 24 carbon atoms in the chain. In general, the life of the antifouling protection is dependent upon the rate at which the impregnant dissolves in the water. The dissolution rate, however, decreases with increasing chain length. Compounds such as sodium salts of the long-chain acids as well as dibasic acids are also effective but are more costly to use than the simple straight carbon compounds. It is contemplated that the molten bath may also contain such additives as antioxidants, chelating agents, and the like which are normally employed in small but effective amounts. Fatigue and corrosion resistance may also be imparted to the anodized aluminum object by including aliphatic compounds such as stearic acid in the molten bath along with the antifouling compound.

The antifouling coating process is completed, following impregnation, by rinsing or otherwise removing any excess impregnant from the treated object.

Obviously many modifications and variations of the present invention are possible in the light of the above teachings. It is therefore to be understood that within the scope of the appended claims, the invention may be practiced otherwise than as specifically described herein.

What is claimed is:

1. A process for protecting aluminum objects from fouling, comprising the steps of:
    anodizing the surface of the object exposed to fouling to produce a porous oxide layer thereon; and
    impregnating said oxide layer with a molten antifouling compound selected from the group consisting of tributyltin, tripropyltin esters of vinyl, polymers of tributyltin, tripropyltin esters of acrylic acids, and tripropyltin esters of methacrylic acids.

2. The process set forth in claim 1, wherein said impregnating step is preceeded by the step of:
    forming a mixture by mixing said molten antifouling compound at a concentration greater than about 20% by weight with a long-chain fatty acid, alcohol, or amine having at least about 10 carbon atoms in its chain.

3. The process set forth in claim 1 or claim 2, wherein said impregnating step is preceeded by the step of:
    partially sealing the pores in said oxide layer by immersing said object for about 10 to about 30 minutes in a bath of water at a temperature of at least about 95° C.

4. The process set forth in claim 1 or claim 2, wherein said anodized layer is at least about 7.5 microns in thickness.

5. The process set forth in claim 1 or claim 2, wherein said anodizing is carried out in an aqueous sulfuric acid bath.

6. The process set forth in claim 1, wherein said impregnating step includes:
    immersion of the object into said antifouling compound, which is at a temperature greater than about 10° C. above the melting point of said compound but below that at which decomposition occurs, for at least about one minute.

7. The process set forth in claim 2, wherein said impregnating step includes:
    immersion of the object into said mixture, which is at a temperature greater than about 10° C. above the melting point of said mixture but below that at which decomposition occurs, for at least about one minute.

8. An aluminum object treated in accordance with the process of claim 1.

9. An aluminum object treated in accordance with the process of claim 2.

* * * * *